United States Patent

Onodera et al.

[11] Patent Number: 5,779,618
[45] Date of Patent: Jul. 14, 1998

[54] CENTRIFUGAL SEPARATING FILTER

[75] Inventors: Yasuyuki Onodera; Kenji Mihara, both of Oyama, Japan

[73] Assignee: Komatsu Ltd., Tokyo, Japan

[21] Appl. No.: 860,070

[22] PCT Filed: Dec. 20, 1995

[86] PCT No.: PCT/JP95/02615

§ 371 Date: Jun. 20, 1997

§ 102(e) Date: Jun. 20, 1997

[87] PCT Pub. No.: WO96/19644

PCT Pub. Date: Jun. 27, 1996

[30] Foreign Application Priority Data

Dec. 22, 1994 [JP] Japan ................. 6-336385

[51] Int. Cl.[6] ............... B04B 9/06; F01M 11/03
[52] U.S. Cl. .................. 494/5; 494/7; 494/24; 494/49; 494/84; 494/901; 210/360.1; 210/416.5
[58] Field of Search .............. 494/1, 7, 24, 43, 494/49, 64, 36, 84, 901, 5; 210/360.1, 380.1, 232, 416.5, 168, 171

[56] References Cited

U.S. PATENT DOCUMENTS

| 3,432,091 | 3/1969 | Beazley ................ 494/36 |
| 3,784,092 | 1/1974 | Gibson ................ 494/24 X |
| 4,221,323 | 9/1980 | Courtot ............... 494/49 X |
| 4,492,631 | 1/1985 | Martin ................ 494/901 X |
| 4,498,898 | 2/1985 | Haggett ............... 494/24 X |
| 4,557,831 | 12/1985 | Lindsay et al. .......... 210/232 |
| 5,096,581 | 3/1992 | Purvey ................ 494/64 X |

FOREIGN PATENT DOCUMENTS

| 48-25128 | 3/1973 | Japan . |
| 50-11177 | 2/1975 | Japan . |
| 55-152952 | 11/1980 | Japan . |
| 56-118748 | 9/1981 | Japan . |
| 60-44490 | 10/1985 | Japan . |
| 62-24733 | 6/1987 | Japan . |
| 1-69644 | 5/1989 | Japan . |
| 1-38250 | 11/1989 | Japan . |
| 549175 | 3/1977 | U.S.S.R. ............... 494/49 |

OTHER PUBLICATIONS

SAE Paper 902124.

*Primary Examiner*—Charles E. Cooley
*Attorney, Agent, or Firm*—Sidley & Austin

[57] ABSTRACT

A centrifugal separating filter, which can efficiently separate dirt particles in liquid and keep the liquid clean, includes a turbine driving device (20), which is provided for rotating a rotating member (11) included inside the filter, and the turbine driving device (20) is driven by air pressure or exhaust gas pressure from an internal combustion engine (1) to separate foreign materials in a fluid. A control device (25) is provided for outputting an open/close command signal to a valve (26) provided at a turbine inlet of the turbine driving device (20), based on an output signal from at least one sensor (28) for detecting pressure or rotational speed of the internal combustion engine (1), and an output signal from an oil deterioration sensor (28).

22 Claims, 3 Drawing Sheets

CENTRIFUGAL SEPARATING FILTER

TECHNICAL FIELD

The present invention relates to a centrifugal separating filter, and more particularly, to a filter for separating, by centrifugal force, foreign materials which are mixed in lubricating oil of an internal combustion engine.

BACKGROUND ART

Hitherto, reducing combustion temperature has been considered as one means for improving exhaust emission of an internal combustion engine. To realize this, the fuel injection timing is delayed, and fuel is injected even after a piston has entered an expansion stroke. For this reason, a fuel injection range extends to an outer periphery of the piston, and afterburning due to delayed injection timing increases, so that soot particles are likely to attach to a cylinder liner. The soot particles, attached to the cylinder liner, are scraped off by a piston ring, and drop into the oil pan together with lubricating oil. When the amount of soot particles mixed into the lubricating oil increases, there arises a problem in that deterioration of the lubricating oil is hastened and early-clogging of an oil filter is caused.

FIG. 3 is a schematic diagram of an engine lubrication circuit. Lubricating oil, which has lubricated each part of an engine (internal combustion engine) 1, is pumped by an oil pump 3 after returning to an oil pan 2. About 90% of the pumped lubricating oil is filtered by a full-flow filter 4, and fed under pressure to each part of the engine 1. The remaining 10% of the lubricating oil is filtered by a by-pass filter 5, and returns again to the oil pan 2. By-pass filters 5 are roughly divided into two types: one type filters lubricating oil through a filter paper, and the other type rotates the lubricating oil at high speed to separate foreign materials and soot particles by centrifugal force.

As a technique for cleaning the lubricating oil by separating foreign materials through the use of centrifugal force, a centrifugal force-type filter disclosed in Japanese Unexamined Patent Publication No. 55-152952, for example, has been known. The filter is provided on a side surface of a flywheel, and rotated by the rotation of the engine crankshaft. In addition, SAE PAPER 902124 discloses a filter which rotates a fluid itself by pressure thereof using a turbine principle (utilization of reactive force of oil jet). However, these methods cannot provide sufficient centrifugal force because of the low rotational speed of the filter, so lightweight soot particles cannot be completely removed.

A centrifugal by-pass filter 10 (hereinafter, referred to as a filter 10), shown in FIG. 4, rotates an inner cylinder 11, which is a rotating member, using engine oil pressure, and at the same time, cleans lubricating oil by centrifugation. The lubricating oil, which has bypassed from a hydraulic circuit of an engine, flows into the filter through an oil inlet 14, provided at a lower portion of the filter 10, and rises in a hollow spindle 15. After rising, the lubricating oil passes through each of the holes in the hollow spindle 15, the baffle plate 16, and the screen 17 to be discharged into an inner space of the inner cylinder 11. Foreign materials, mixed in the lubricating oil, are separated and aggregated to attach to an inner wall of the inner cylinder 11 in the form of sludge. On the other hand, clean lubricating oil is fed to a drive chamber 18 through a hole formed in the lower portion of the screen 17. The clean lubricating oil passes through an oil exhaust nozzle 13 to thereby rotate the inner cylinder 11. Under a normal engine oil pressure of 4 to 7 $kg/cm^2$, the rotational speed of the inner cylinder 11 is 4000 to 7000 rpm.

The clean lubricating oil, which has passed through the oil exhaust nozzle 13, returns to the oil pan from the oil outlet 19.

In recent years, however, dispersibility of the lubricating oil, i.e., the ability to disperse and hold fine soot particles of about 0.1 μm in oil has improved. For this reason, it has become difficult for a centrifugal force at about 4000 to 7000 rpm to separate soot particles, etc., mixed in the lubricating oil, and clean the lubricating oil.

SUMMARY OF THE INVENTION

The present invention has been made to solve the problems of the prior art, and its object is to provide a centrifugal separating filter capable of efficiently separating dirt particles such as soot particles mixed in highly dispersible engine oil.

According to the present invention, there is provided centrifugal separating filter which includes an inner rotating member and which separates foreign materials in a fluid by rotating the rotating member, wherein the filter is provided with a turbine driving device for rotating the rotating member, and the turbine driving device is driven by air pressure or exhaust gas pressure from an internal combustion engine. In addition, the filter is characterized in that the rotating member is rotated by the turbine driving device and the discharging pressure of the fluid. Further, a control device can be provided for outputting an open/close command signal to a valve, provided at a turbine inlet of the turbine driving device, based on an output signal of at least one sensor among pressure sensors for detecting boost pressure, exhaust gas pressure, and lubricating oil pressure of the internal combustion engine and speed sensors for detecting the rotational speed of the internal combustion engine and the rotational speed of a turbocharger, and an output signal of an oil deterioration sensor for detecting fouling of the lubricating oil in the internal combustion engine.

According to such a construction, since the turbine driving device utilizing air pressure or exhaust gas pressure of the internal combustion engine is provided as a driving means of the rotating member, the centrifugal separating filter can be rotated at a high speed of tens of thousands of rpms or more. Since this rotational speed is five times as fast as that of the conventional centrifugal separating filter, even dirt particles such as soot particles mixed in a fluid (for example, highly dispersible engine oil) can be efficiently separated. In addition, by energizing the fluid ejecting force from a fluid exhaust nozzle, the rotational speed of an inner cylinder having a filtering function is increased.

In addition, the control device judges whether or not the centrifugal separating filter is being driven, based on an output signal from at least one sensor for detecting the driving condition of the internal combustion engine, and an output signal of the oil deterioration sensor. Therefore, by actuating the centrifugal separating filter only when the amount of dirt particles exceeds a predetermined value, the dirt particles can be efficiently separated, and only clean oil can be collected.

BEST MODE FOR CARRYING OUT THE INVENTION

The preferred embodiment of a centrifugal separating filter according to the present invention will be described in detail with reference to the attached drawings.

Figure 1:
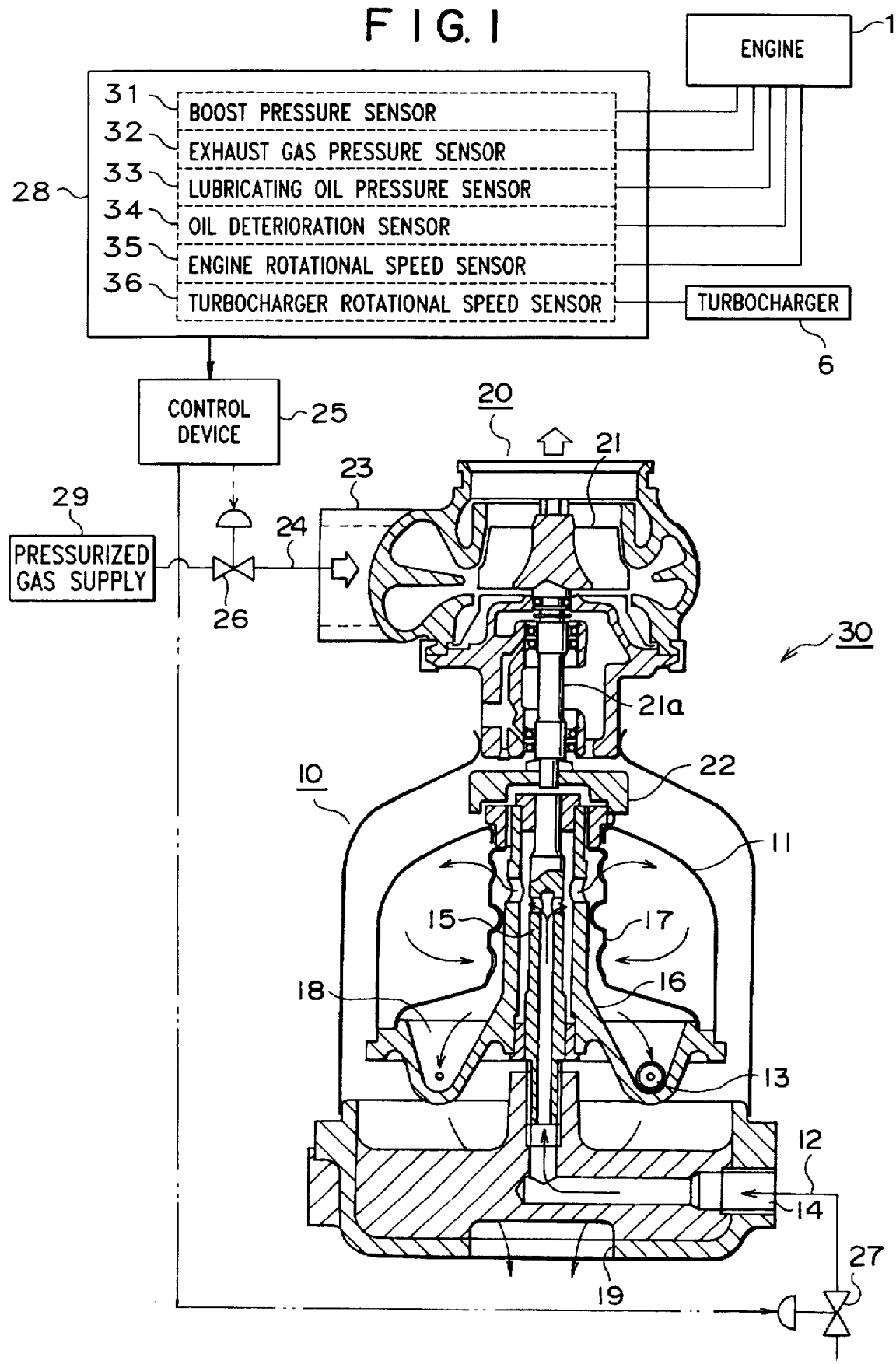
FIG. 1 is a sectional view showing a schematic structure of an air drive-type centrifugal separating filter according to an embodiment of the present invention.
Figure 3:
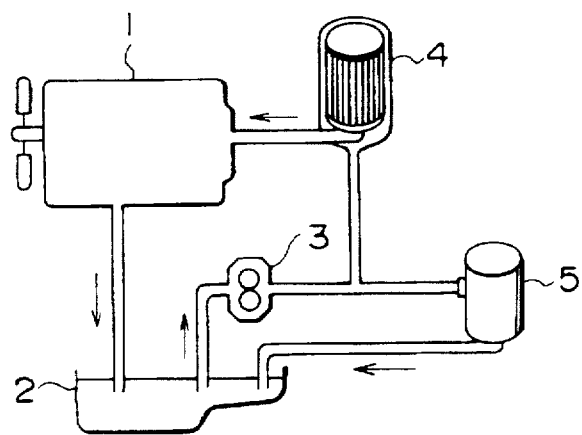
FIG. 3 is a schematic diagram of an engine lubrication circuit having a full-flow/by-pass combined-type filtering device according to the prior art.

Referring to FIG. 1, the air driving-type centrifugal separating filter 30 is one in which a turbine driving device 20 is mounted to an existing filter (oil jet-type centrifugal separating filter) 10. In this embodiment, it is applied as a by-pass filter for engine lubricating oil. When an engine 1 (see FIG. 3) is mounted in various types of vehicles, a pressurized gas supply 29, in the form of exhaust gas from the engine 1, is used as a driving source for the turbine driving device 20. In addition, in the case of a stationary-type engine, a pressurized gas supply 29, in the form of high-pressure air supplied from a general air compressor, can be used as the driving source of the turbine driving device 20. A rotational shaft 21a of a turbine impeller 21 is held by bearings at upper and lower portions thereof, and is engaged with the upper end of an inner cylinder (rotating member) 11 of a filter 10 through a coupling 22 fitted to the lower end thereof.

To an inlet pipe 23 of the turbine driving device 20, a pipe 24 for passing exhaust gas or high-pressure air therethrough is connected, and the pipe 24 is provided with a valve 26 which is opened and closed by a command signal of a control device 25. In addition, when applied to a hydraulic pipe for guiding lubricating oil from an engine oil pan 2 to a full-flow filter 4, as in FIG. 3, a branching by-pass pipe is connected. The by-pass pipe is the by-pass pipe 12 shown in FIG. 1. The by-pass pipe 12 is provided with a valve 27 which is opened and closed by a command signal from the control device 25.

A sensor 28 represents at least one sensor (one or more pressure sensors, and/or one or more speed sensors) among a pressure sensor 31 for detecting the boost pressure of the internal combustion engine 1, a pressure sensor 32 for detecting the exhaust gas pressure of the internal combustion engine 1, a pressur sensor 33 for detecting the lubricating oil pressure of the internal combustion engine 1, a speed sensor 35 for detecting the rotational speed of the internal combustion engine 1, a speed sensor 36 for detecting the rotational speed of a turbocharger 6, and an oil deterioration sensor 34 for detecting fouling of lubricating oil in the internal combustion engine 1. The control device 25 outputs an open/close command signal to the valves 26 and 27, based on (a) an output signal of the oil deterioration sensor 34 and (b) an output signal of one of the pressure sensors 31, 32, and 33 and/or an output signal of one of the speed sensors 35 and 36.

Figure 4:
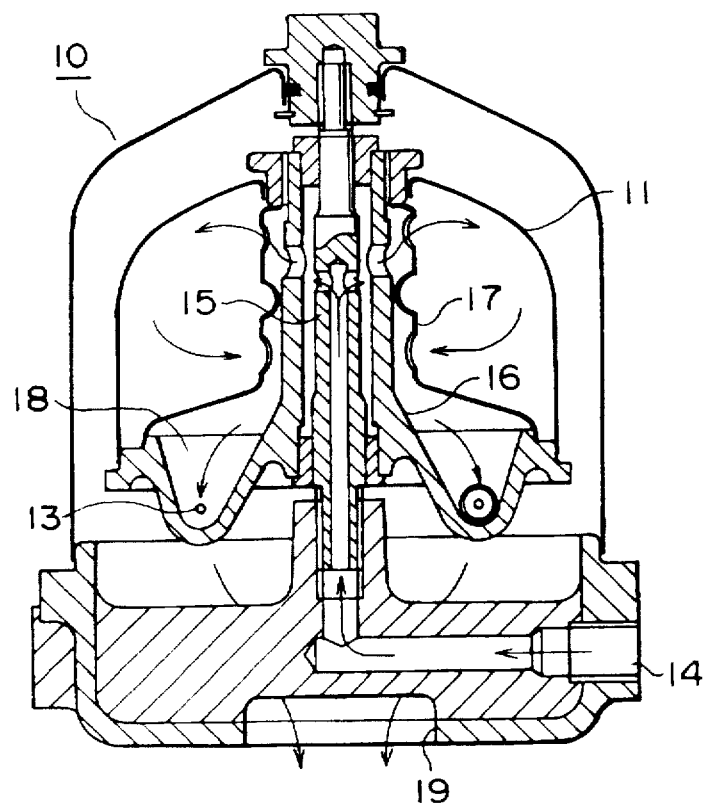
FIG. 4 is a sectional view showing a schematic structure of a general centrifugal by-pass filter according to the prior art.

An operation due to the above construction will be described. The air driving-type centrifugal separating filter 30 is actuated when both the output signal from the oil deterioration sensor 34 and the output signal from the engine speed sensor 35, for example, exceed predetermined values. That is, the lubricating oil, which has passed through the by-pass pipe 12 when the valve 27 was opened by the command signal of the control device 25, flows into the filter 10 from the bottom thereof. At the same time, the valve 26 of the pipe 24 is opened, and the turbine impeller 21 rotates at a high speed of tens of thousands of revolutions per minute or more by exhaust gas pressure from the engine 1. Foreign materials, in the lubricating oil flowing into the filter 10, are separated by the same course as that of the conventional filter 10 shown in FIG. 4. To a drain hole formed in the lower portion of the inner cylinder 11, an oil exhaust nozzle 13 is fitted as in the case of the conventional filter. The cleaned lubricating oil is injected from the oil exhaust nozzle 13 to thereby slightly contribute to an increase in the rotational speed of the inner cylinder 11. Incidentally, the oil exhaust nozzle 13 can be removed so as to exhibit only a drain function.

Figure 2:
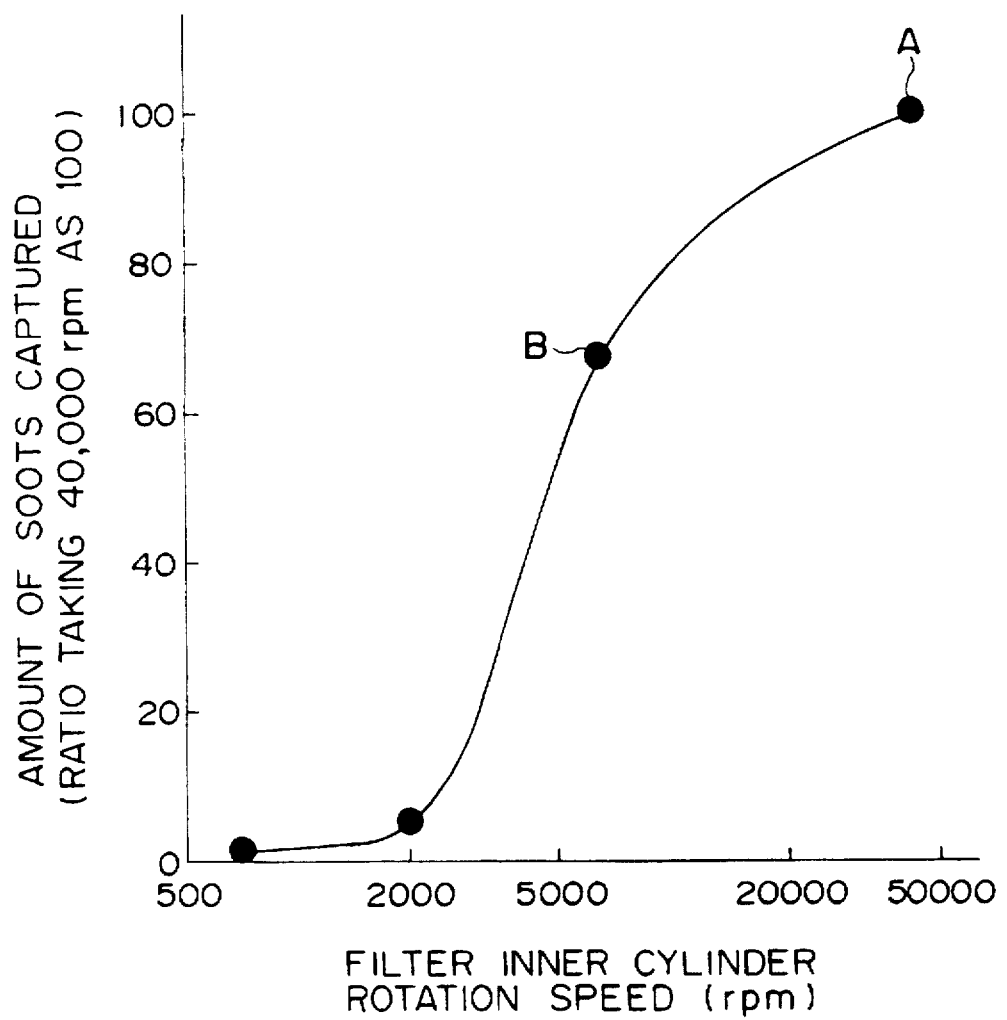
FIG. 2 is a diagram showing a relationship between the inner cylinder rotational speed of a centrifugal separating filter and the amount of soot particles captured according to the embodiment.

Referring to FIG. 2, a black dot A refers to a case of this embodiment, and a black dot B refers to a case of the conventional centrifugal separating filter. Incidentally, the amount of soot particles captured is represented by a ratio taking a value of 100 when the rotational speed of the inner cylinder 11 is 40,000 rpm. It is apparent from the drawing that the amount of soot particles captured increase as the rotational speed of the inner cylinder 11 increases. When the rotational speed is tens of thousands of rpm or more as in this embodiment, the amount of soot particles increases by about 1.5 times as much as the conventional amounts.

Although a by-pass filter for filtering lubricating oil of the engine has been described in this embodiment, the filter is not limited thereto. The centrifugal separating filter of the present invention may be used for cleaning lubricating oil, working fluid, and other liquids used in various types of machinery.

INDUSTRIAL APPLICABILITY

The present invention is useful as a centrifugal separating filter which can efficiently separate dirt particles in highly dispersible engine oil by rotation of an inner cylinder at tens of thousands of rpm or more, and which can keep liquids, such as oil, clean at all times by being actuated when the oil is dirty.

That which is claimed is:

1. A centrifugal separating filter which includes an inner rotating member, and which separates foreign materials in a fluid by rotating the rotating member, said filter comprising:

a turbine driving device (20) for rotating said rotating member (11);

a pressurized gas supply for driving said turbine driving device; and a control device (25) for outputting an open/close command signal, to a valve (26) which is provided at a turbine inlet of said turbine driving device (25), based on an output signal from at least one condition sensor (28) and an output signal from an oil deterioration sensor (28) for detecting fouling of lubricating oil in the internal combustion engine (1), wherein said at least one condition sensor is at least one of (a) a pressure sensor for detecting a boost pressure of an internal combustion engine (1), (b) a pressure sensor for detecting an exhaust gas pressure of the internal combustion engine, (c) a pressure sensor for detecting a lubricating oil pressure of the internal combustion engine, (d) a speed sensor for detecting a rotational speed of the internal combustion engine, and (e) a speed sensor for detecting a rotational speed of a turbocharger (6).

2. A centrifugal separating filter which includes an inner rotating member, and which separates foreign materials in a fluid by rotating the rotating member, said filter comprising:

a turbine driving device (20) for rotating said rotating member (11);

a pressurized gas supply for driving said turbine driving device; and a control device (25) for outputting an open/close command signal, to a valve (26) provided at a turbine inlet of said turbine driving device (25), based on an output signal from at least one condition sensor (28) and an output signal from an oil deterioration sensor (28) for detecting fouling of lubricating oil in the internal combustion engine (1);

wherein said at least one condition sensor is at least one of (a) a pressure sensor for detecting a boost pressure of an internal combustion engine (1), (b) a pressure sensor for detecting an exhaust gas pressure of the internal combustion engine, (c) a pressure sensor for detecting a lubricating oil pressure of the internal combustion engine, (d) a speed sensor for detecting a rotational speed of the internal combustion engine, and (e) a speed sensor for detecting a rotational speed of a turbocharger (6);

wherein said pressurized gas supply supplies either exhaust gas from the internal combustion engine or compressed air from a compressor; and wherein said turbine driving device (20), for rotating said rotating member (11), is driven by air pressure or said exhaust gas pressure, and by ejection pressure of said fluid.

3. Apparatus comprising:

a centrifugal separating filter having an inner rotating member;

a turbine driving device, for rotating said inner rotating member, said turbine driving device having a turbine inlet;

a valve provided at said turbine inlet;

a pressurized gas supply for providing pressurized gas through said valve to said turbine inlet to drive said turbine driving device;

at least one sensor; and a control device for outputting an open/close command signal to said valve based on an output signal from said at least one sensor.

4. Apparatus in accordance with claim 3, further comprising an internal combustion engine, which produces exhaust gas; and a device for providing lubricating oil to the internal combustion engine.

5. Apparatus in accordance with claim 4, wherein said pressurized gas supply provides pressurized exhaust gas from said internal combustion engine through said valve to said turbine inlet to drive said turbine driving device.

6. Apparatus in accordance with claim 4, wherein said pressurized gas supply provides pressurized air through said valve to said turbine inlet to drive said turbine driving device.

7. Apparatus in accordance with claim 4, further comprising:

a turbocharger, which is driven by said internal combustion engine; and wherein said at least one sensor includes at least one of:
a pressure sensor for detecting boost pressure of said internal combustion engine,
a pressure sensor for detecting pressure of exhaust gas produced by said internal combustion engine,
a pressure sensor for detecting pressure of the lubricating oil being provided to said internal combustion engine,
a speed sensor for detecting rotational speed of said internal combustion engine,
a speed sensor for detecting rotational speed of said turbocharger, and
an oil deterioration sensor for detecting fouling of the lubricating oil in the internal combustion engine.

8. Apparatus in accordance with claim 4, wherein said inner rotating member of said centrifugal separating filter is rotated so as to separate foreign materials from a fluid which is passed through said centrifugal separating filter.

9. Apparatus in accordance with claim 8, wherein said fluid comprises lubricating oil from said internal combustion engine.

10. Apparatus in accordance with claim 4, wherein said turbine driving device is provided with a fluid exhaust nozzle which produces an energizing fluid ejecting force, so that said rotating member is driven by the energizing fluid ejecting force as well as by the pressurized gas from said pressurized gas supply.

11. Apparatus in accordance with claim 3, wherein said pressurized gas supply provides pressurized air through said valve to said turbine inlet to drive said turbine driving device.

12. Apparatus in accordance with claim 3, wherein said at least one sensor comprises at least one pressure sensor for detecting a pressure associated with an internal combustion engine.

13. Apparatus in accordance with claim 3, wherein said at least one sensor comprises at least one speed sensor for detecting a rotational speed of an internal combustion engine.

14. Apparatus comprising:

an internal combustion engine, which produces exhaust gas;

a centrifugal separating filter having an inner rotating member for filtering lubricating oil from the internal combustion engine;

a turbine driving device, for rotating said inner rotating member, said turbine driving device having a turbine inlet;

a valve provided at said turbine inlet;

a pressurized gas supply for providing pressurized gas through said valve to said turbine inlet to drive said turbine driving device;

at least one condition sensor for detecting an operating condition of the internal combustion engine;

an oil deterioration sensor for detecting fouling of lubricating oil in the internal combustion engine; and a control device for outputting an open/close command signal to said valve based on an output signal from said at least one condition sensor and an output signal from said oil deterioration sensor.

15. Apparatus in accordance with claim 14, wherein said pressurized gas supply provides pressurized exhaust gas from said internal combustion engine through said valve to said turbine inlet to drive said turbine driving device.

16. Apparatus in accordance with claim 14, wherein said pressurized gas supply provides pressurized air through said valve to said turbine inlet to drive said turbine driving device.

17. Apparatus in accordance with claim 14, wherein said at least one condition sensor is at least one of (a) a pressure sensor for detecting a boost pressure of the internal combustion engine, (b) a pressure sensor for detecting an exhaust gas pressure of the internal combustion engine, (c) a pressure sensor for detecting a lubricating oil pressure of the internal combustion engine. (d) a speed sensor for detecting a rotational speed of the internal combustion engine, and (e) a speed sensor for detecting a rotational speed of a turbocharger.

18. Apparatus in accordance with claim 14, wherein said at least one condition sensor includes a pressure sensor for detecting a boost pressure of the internal combustion engine.

19. Apparatus in accordance with claim 14, wherein said at least one condition sensor includes a pressure sensor for detecting an exhaust gas pressure of the internal combustion engine.

20. Apparatus in accordance with claim 14, wherein said at least one condition sensor includes a pressure sensor for detecting a lubricating oil pressure of the internal combustion engine.

21. Apparatus in accordance with claim 14, wherein said at least one condition sensor includes a speed sensor for detecting a rotational speed of the internal combustion engine.

22. Apparatus in accordance with claim 14, wherein said at least one condition sensor includes a speed sensor for detecting a rotational speed of a turbocharger.

* * * * *